(12) United States Patent
Mao et al.

(10) Patent No.: US 9,018,122 B2
(45) Date of Patent: Apr. 28, 2015

(54) NANOSTRUCTURES HAVING CRYSTALLINE AND AMORPHOUS PHASES (75) Inventors: Samuel S. Mao, Castro Valley, CA (US); Xiaobo Chen, Albany, CA (US)

(73) Assignee: The Regents of the University of California, Oakland, CA (US)

( * ) Notice: Subject to any disclaimer, the term of this patent is extended or adjusted under 35 U.S.C. 154(b) by 236 days.

(21) Appl. No.: 13/256,421

(22) PCT Filed: Mar. 3, 2010

(86) PCT No.: PCT/US2010/026081
§ 371 (c)(1),
(2), (4) Date: Feb. 5, 2012

(87) PCT Pub. No.: WO2010/104717
PCT Pub. Date: Sep. 16, 2010

(65) Prior Publication Data
US 2012/0118723 A1 May 17, 2012

Related U.S. Application Data (60) Provisional application No. 61/180,208, filed on May 21, 2009, provisional application No. 61/159,759, filed on Mar. 12, 2009, provisional application No. 61/163,856, filed on Mar. 26, 2009.

(51) Int. Cl.
*B01J 21/00* (2006.01)
*C01D 1/00* (2006.01)
(Continued)

(52) U.S. Cl.
CPC .............. *B01J 35/004* (2013.01); *B01J 21/063* (2013.01); *B01J 23/42* (2013.01); *B01J 35/0006* (2013.01); *B01J 35/002* (2013.01); *B01J 37/349* (2013.01); *B82Y 30/00* (2013.01); *C01G 23/047* (2013.01); *C01P 2002/72* (2013.01); *C01P 2002/85* (2013.01); *C01P 2004/04* (2013.01); *C01P 2004/64* (2013.01); *C01P 2006/40* (2013.01);
(Continued)

(58) Field of Classification Search
None
See application file for complete search history.

(56) References Cited

U.S. PATENT DOCUMENTS 5,597,515 A * 1/1997 Kauffman et al. ........ 252/519.12
7,658,899 B2 * 2/2010 Nagata et al. ............ 204/157.15
(Continued)

OTHER PUBLICATIONS

Barborini, E., Kholmaov, I.N., Conti, A.M., Piseri, P. Vinati, S., Milani, P., Dicati, C., Supersonic Cluster Beam Deposition of Nanostructured Titania, Jul. 3, 2003, The European Physical Journal D, 24, pp. 277-282.*

Liao et al., Preparation and properties of amorphous titania-coated zinc oxide nanoparticles, 2006, Journal of Solid State Chemistry, vol. 179, pp. 2020-2026.*

*Primary Examiner* — Peter Y Choi
*Assistant Examiner* — Christine Rea
(74) *Attorney, Agent, or Firm* — Lawrence Berkeley; National Laboratory (57) ABSTRACT The present invention includes a nanostructure, a method of making thereof, and a method of photocatalysis. In one embodiment, the nanostructure includes a crystalline phase and an amorphous phase in contact with the crystalline phase. Each of the crystalline and amorphous phases has at least one dimension on a nanometer scale. In another embodiment, the nanostructure includes a nanoparticle comprising a crystalline phase and an amorphous phase. The amorphous phase is in a selected amount. In another embodiment, the nanostructure includes crystalline titanium dioxide and amorphous titanium dioxide in contact with the crystalline titanium dioxide. Each of the crystalline and amorphous titanium dioxide has at least one dimension on a nanometer scale.

9 Claims, 8 Drawing Sheets (51) Int. Cl.
  *B01J 35/00* (2006.01)
  *B01J 21/06* (2006.01)
  *B01J 37/34* (2006.01)
  *B82Y 30/00* (2011.01)
  *C01G 23/047* (2006.01)
  *C02F 1/72* (2006.01)
  *B01J 23/42* (2006.01)
  *C02F 1/32* (2006.01)

(52) U.S. Cl.
  CPC . *C02F 1/32* (2013.01); *C02F 1/725* (2013.01); *Y10S 977/762* (2013.01)

(56) References Cited

U.S. PATENT DOCUMENTS

| | | | |
|---|---|---|---|
| 8,088,544 B2* | 1/2012 | Sacripante | 430/110.2 |
| 2002/0177311 A1* | 11/2002 | Schumacher et al. | 438/689 |
| 2006/0180193 A1* | 8/2006 | Park et al. | 136/243 |
| 2007/0102282 A1* | 5/2007 | Beckman et al. | 204/192.1 |
| 2008/0234395 A1* | 9/2008 | Miyasaka | 516/33 |
| 2009/0126604 A1* | 5/2009 | Akhtar et al. | 106/438 |

* cited by examiner

NANOSTRUCTURES HAVING CRYSTALLINE AND AMORPHOUS PHASES

RELATED APPLICATIONS

This application claims priority to PCT Application PCT/US2010/026081 filed Mar. 3, 2010, which in turn claims priority to U.S. Provisional Patent Application Ser. Nos. 61/159,759, filed Mar. 12, 2009; 61/163,856, filed Mar. 26, 2009; and, 61/180,208, filed May 21, 2009; which are hereby incorporated by reference in their entireties.

STATEMENT OF GOVERNMENT SUPPORT

This invention was made with government support under Contract No. DE-AC02-05CH11231 awarded by the U.S. Department of Energy. The government has certain rights in this invention.

BACKGROUND OF THE INVENTION

The present invention relates to the field of material science and, more particularly, to the field of material science which includes nanostructures. The present invention also relates to the field of chemistry and, more particularly, to the field of photocatalysis.

Material science has uncovered semiconductors with electronic properties that are strikingly beneficial to a number of desirable clean energy and environmental technologies based on solar-driven photocatalysis. Of a range of materials that have been investigated in pursuit of greater utilization of solar energy, currently the most effective semiconductor for photocatalysis is titanium dioxide ($TiO_2$), which absorbs light from only the ultraviolet (UV) portion of the solar spectrum. That is, $TiO_2$ has a band gap that corresponds to the energy of a UV photon. As a consequence, $TiO_2$ can absorb but a small fraction of solar radiation, leaving over 90% of the energy in the solar spectrum essentially wasted. Narrowing the band gap of $TiO_2$ is therefore vital to achieve efficient absorption of sunlight, which is true for all wide band gap semiconductors if they are to be used in an energy conversion process driven by solar radiation. While impurity doping is a well-established method of tuning the band gap, its application to $TiO_2$ has had only limited success.

Solar radiation is an energy resource that can be used to produce electricity and clean fuel, or used in combination with selected semiconductors to induce environmentally important photocatalytic reactions such as air purification and water decontamination. Effectiveness of solar-driven photocatalysis is determined to a great extent by the semiconductor's capability of absorbing visible and infrared light, in addition to the requirement of a large surface area that can facilitate a fast rate of surface reactions. Nanostructured $TiO_2$ has emerged as a unique wide band gap semiconductor photocatalyst that plays a key role in a variety of solar-driven clean energy and environmental technologies (see, e.g., Grätzel, Photoelectrochemical cells, *Nature*, 414, 338-344 (2001); Hoffmann et al., Environmental applications of semiconductor photocatalysis, *Chem. Rev.*, 95, 69-96 (1995); and Fujishima et al., $TiO_2$ photocatalysts and related surface phenomena, *Surf. Sci. Rpts*, 63, 515-582 (2008)). Nevertheless, despite decades of extensive research, the true potential of $TiO_2$ has not been realized, as the material absorbs only in the UV portion of the solar spectrum.

To overcome limited absorption of solar radiation by $TiO_2$, extensive efforts have been made to vary its chemical composition by adding controlled metal or non-metal impurities that generate discrete donor or acceptor energy states in the band gap (see., e.g., Asahi et al., Visible-light photocatalysis in nitrogen-doped titanium oxides, *Science*, 293, 269-271 (2001)). Through such impurity doping, the solar absorption characteristics of $TiO_2$ have been improved to some extent. For example, when non-metal light-element dopants are introduced, absorption by $TiO_2$ can be modified as the result of electronic transitions from the dopant 2p or 3p orbitals to the titanium 3d orbitals. Nitrogen-doped $TiO_2$ so far exhibits the best response to solar radiation, but its absorption in the visible and infrared wavelength portions of the solar spectrum remains inefficient. For example, see Chen et al., The electronic origin of the visible-light absorption properties of C-, N- and S-doped TiO2 nanomaterials, *J. Am. Chem. Soc.*, 130, 5018-5019 (2008), which reported that N-doped $TiO_2$ has: (a) a band gap of 3.0 eV; (b) an absorption spectrum that exhibits a decreasing absorbance from 415-550 nm (a shoulder) and a diminishing absorbance from 550-800 nm (a tail); and (c) no absorption above 800 nm (i.e. an absorption edge of 800 nm).

SUMMARY OF THE INVENTION

The present invention includes a nanostructure, a method of making the nanostructure, and a method of photocatalysis. According to an embodiment, the nanostructure includes a crystalline phase and an amorphous phase. The amorphous phase is in contact with the crystalline phase. Each of the crystalline and amorphous phases has at least one dimension on a nanometer scale. According to another embodiment, the nanostructure includes a nanoparticle. The nanoparticle includes a crystalline phase and an amorphous phase. The amorphous phase is in a selected amount. According to yet another embodiment, a nanostructure includes crystalline titanium dioxide and amorphous titanium dioxide. The amorphous titanium dioxide is in contact with the crystalline titanium dioxide. Each of the crystalline and amorphous titanium dioxide has at least one dimension on a nanometer scale.

According to an embodiment, the method of making the nanostructure includes providing a crystalline nanostructure and changing a portion of the crystalline nanostructure to an amorphous phase. A remaining portion of the crystalline nanostructure and the amorphous phase each has at least one dimension on a nanometer scale.

According to an embodiment, the method of photo catalysis includes contacting a reactant fluid to a nanostructure. The nanostructure includes a crystalline phase and an amorphous phase in contact with the crystalline phase. Each of the crystalline and amorphous phases has at least one dimension on a nanometer scale. The nanostructure is exposed to light, which produces a reaction product from the reactant fluid.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Embodiments of the present invention include a nanostructure and a method of making the nanostructure. The nanostructure may be a nanoparticle or a collection of nanoparticles.

An embodiment of a nanostructure of the present invention includes a crystalline phase and an amorphous phase. The amorphous phase is in contact with the crystalline phase. Each of the crystalline and amorphous phases has at least one dimension on a nanometer scale. As used herein, a nanometer scale according to some embodiments is within a range of about 0.5 to 200 nm, according to other embodiments is within a range of about 0.5 to 100 nm, and according to yet other embodiments is within a range of about 0.5 nm to 1 µm.

The at least one dimension for each of the crystalline and amorphous phases may be a length, a diameter, or a thickness. For example, if the nanostructure is a nanoparticle having a crystalline core and an amorphous shell, the at least one dimension for the crystalline core is a diameter and the at least one dimension for the amorphous shell is a thickness. In an embodiment, the amorphous phase is in a selected amount. Such an amount is selected during fabrication of the nanostructure. The expressions "disorder-engineering" and "disorder-engineered" are used herein to describe the process of making the nanostructure and selecting the amount of the amorphous phase (i.e. the disorder) in the nanostructure.

Figure 1:
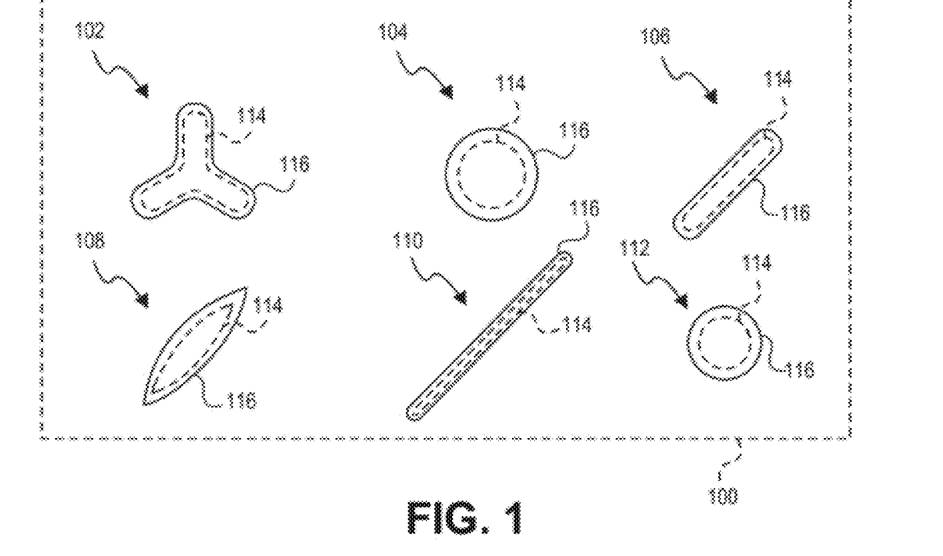
FIG. 1 illustrates embodiments of nanoparticles of the present invention.

Embodiments of nanoparticles of the present invention are illustrated in FIG. 1. The nanoparticles 100 include a branched nanoparticle 102, a nanodisk 104, a nanorod 106, a nanospindle 108, a nanowire 110, and a quantum dot 112. Each of the embodiments 100 includes a crystalline phase 114 and an amorphous phase 116. The nanoparticles 100 may be produced as nanocrystals using a solution chemistry approach, which is discussed more fully below. Portions of the nanocrystals may then be changed to the amorphous phase 116 by exposing the nanocrystals to a gas at elevated temperature and pressure, by selectively exposing a portion or portions of the nanocrystals to an ion beam, or by some other suitable technique.

It will be readily apparent to one skilled in the art that other embodiments of nanoparticles beyond those shown in FIG. 1 fall within the scope of the present invention. For example, an embodiment of a nanoparticle of the present invention may be a quantum dot that includes a protruding member where such a nanoparticle includes crystalline and amorphous phases.

Figure 2:
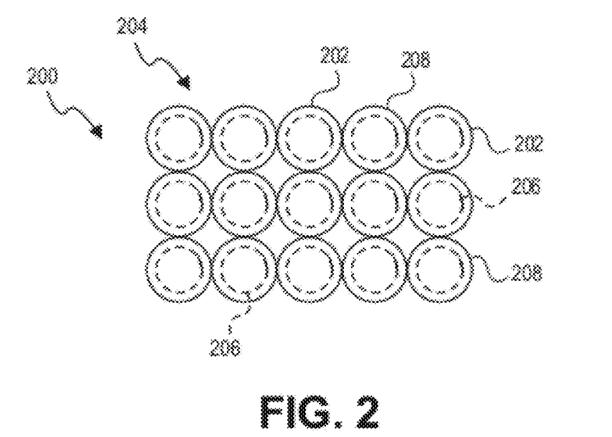
FIG. 2 illustrates an embodiment of a nanostructure of the present invention.

Another embodiment of a nanostructure of the present invention is illustrated in FIG. 2. The nanostructure 200 includes nanoparticles 202 that are formed into a porous network 204. Each of the nanoparticles 202 include a crystalline core 206 (i.e. a crystalline phase) and an amorphous shell or partial shell 208 (i.e. an amorphous phase). Both the crystalline core 106 and the amorphous shell 208 have dimensions on a nanometer scale. In an embodiment, the nanoparticles 202 are $TiO_2$ nanoparticles that include H atoms within the amorphous shell 208. The nanostructure 202 may be made using a solution chemistry technique to produce a nanostructure of crystalline nanoparticles in a porous network. The amorphous phase may be produced by exposing the nanostructure of the crystalline nanoparticles to a gas at an elevated temperature and pressure or by some other suitable technique.

It will be readily apparent to one skilled in the art that the nanostructure 200 is a plane of nanoparticles 202 in a cubic structure of the nanoparticles 202. Further, it will be readily apparent to one skilled in the art that other nanostructures that form a porous network of nanoparticles are within the scope of the present invention. For example, the nanoparticles 202 may be arranged in a hexagonal close packed structure or some other structure that may or may not have a repeating structural unit as in the cubic or hexagonal close packed structures. Moreover, a nanostructure that forms a porous network of the present invention may be formed by any of nanoparticles that are within the scope of the present invention.

Figure 3:
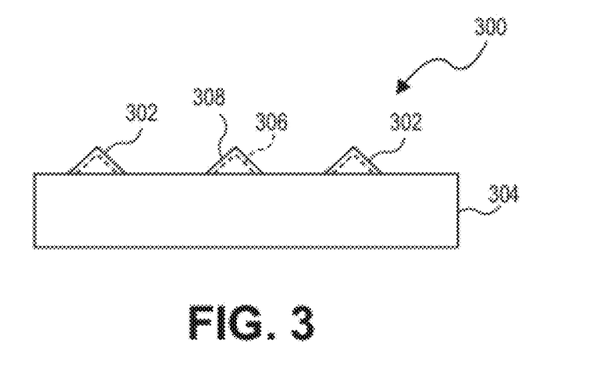
FIG. 3 illustrates an embodiment of a nanostructure of the present invention.

Another embodiment of a nanostructure of the present invention is illustrated in FIG. 3. The nanostructure 300 includes nanoparticles 302 coupled to a substrate 304. The nanoparticles 302 include a crystalline phase 306 and an amorphous phase 308. The nanoparticles 302 may be grown on the substrate 304 by a vapor deposition technique such as CVD (chemical vapor deposition) or PVD (physical vapor deposition).

Figure 4:
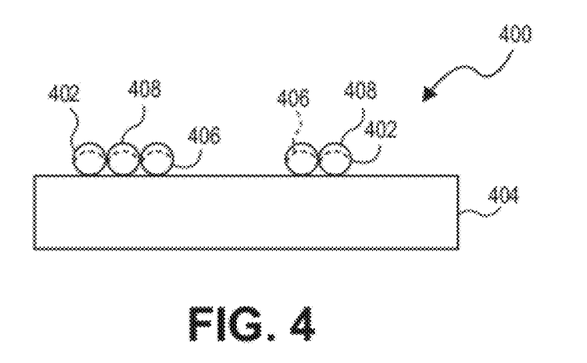
FIG. 4 illustrates an embodiment of a nanostructure of the present invention.

Another embodiment of a nanostructure of the present invention is illustrated in FIG. 4. The nanostructure 400 includes nanoparticles 402 coupled to a substrate 404. The nanoparticles include a crystalline phase 406 and an amorphous phase 408. The nanoparticles 402 may be deposited on the substrate using a micro-printing process or a lithography process.

In FIGS. 3 and 4, the amorphous phase, 308 or 408, of the nanostructure, 300 or 400, may be produced by changing portions of crystalline nanoparticles to the amorphous phase, 308 or 408, by exposing the crystalline nanoparticles to a gas at elevated temperature and pressure, by selectively exposing the crystalline nanoparticles to an ion beam, or by some other suitable technique.

Figure 5:
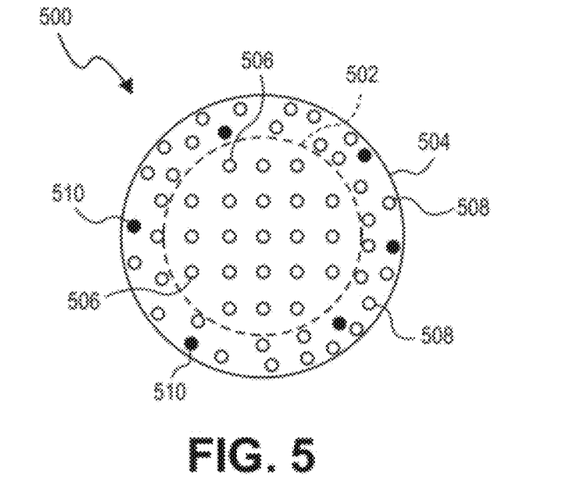
FIG. 5 illustrates an embodiment of a nanoparticle of the present invention.

A cross-section of an embodiment of a nanoparticle of the present invention is illustrated in FIG. 5. The nanoparticle 500 includes a crystalline core 502 and an amorphous shell 504. Atoms 506 within the crystalline core 502 form a lattice structure (i.e. a crystalline structure) and atoms 508 within the amorphous shell 504 exhibit disorder. In an embodiment, the amorphous shell 504 includes dopants 510. In an embodiment, the nanoparticle 500 is a $TiO_2$ nanoparticle that may include H dopant atoms in the amorphous shell 504. While an assembly of such $TiO_2$ nanoparticles retains the benefits of the crystalline cores 502, the amorphous phase (i.e. the disorder) of the nanoparticles possibly with the addition of a dopant significantly enhance optical absorption into the visible and infrared. It is believed that the enhanced optical absorption is due to a combination of a narrowing of a band gap for the crystalline $TiO_2$ nanoparticles due to the addition of the amorphous shell 504 and to band tails introduced within the band gap by the amorphous phase of the shell 504.

Figure 6A:
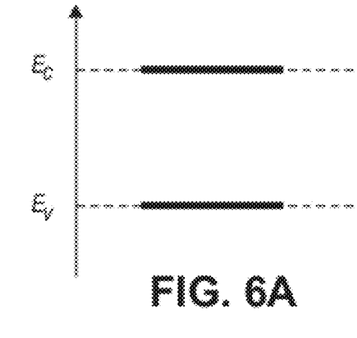
FIGS. 6A, 6B, and 6C illustrate band gaps for a bulk semiconductor, a crystalline nanoparticle, and an embodiment of a nanoparticle of the present invention, respectively.
Figure 6B:
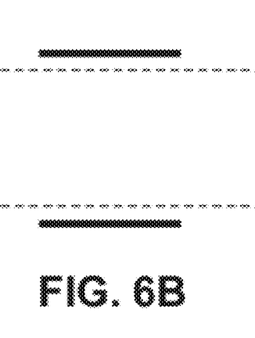
Figure 6C:
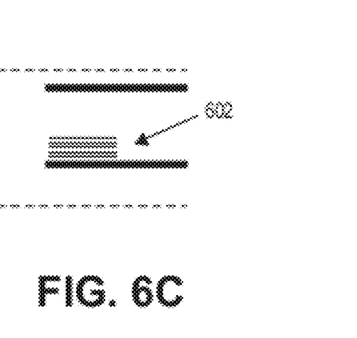

FIGS. 6A, 6B, and 6C illustrate band gaps for a bulk semiconductor, a crystalline nanoparticle of the semiconductor, and a nanoparticle of the semiconductor in accordance with an embodiment of the present invention (e.g., the nanoparticle 500), respectively. In FIG. 6A, the band gap for the bulk semiconductor is the energy gap between the valence band $E_V$ (i.e. an energy of $E_V$ or lower) and the conduction band $E_C$ (i.e. an energy of $E_C$ or higher). When the bulk material absorbs a photon, an electron moves from the valence band $E_V$ to the conduction band $E_C$. In FIG. 6B, the crystalline nanoparticle of the semiconductor exhibits a widening of the band gap due to quantum confinement. In FIG. 6C, the nanoparticle of the semiconductor in accordance with an embodiment of the present invention exhibits a narrowing of the band gap and the introduction of band tails 602. In terms of absorbance (i.e. a measure of absorption of light at a particular wavelength) for a nanoparticle 500 of $TiO_2$, the narrowing of the band gap moves an absorption edge from the UV portion of the spectrum to the infrared portion of the spectrum and the band tails move the absorption edge further into the infrared portion of the spectrum. As used herein, the absorption edge is a light wavelength (e.g., a UV, visible, or infrared wavelength) where there is some absorbance just below the wavelength and there is no absorbance just above the wavelength. The band gap for the nanoparticle 500 of $TiO_2$ is significantly lower than what was available previously and the wavelength for the absorption edge is significantly higher. This allows applications of an assembly of the nanoparticles 500 of $TiO_2$ in photocatalysis and photovoltaics with greatly improved response when exposed to solar radiation. Thus, the present invention provides chemical properties (e.g., improved photocatalysis) and physical properties (e.g., lower band gap) for a particular material that were not previously available.

The nanoparticle 500 (FIG. 5) may have its band gap tuned to a particular value by controlling the size of the nanoparticle 500 and a thickness of the amorphous shell 504. For example, embodiments of nanoparticles 500 made of $TiO_2$ may be produced in which the band gap can be tuned to various values between that of a nanocrystal of $TiO_2$ (e.g., a band gap of 3.3 eV) and that of a nanoparticle 500 of $TiO_2$ that has a relatively narrow band gap (e.g., a band gap of 1.5 eV or lower).

Applications for $TiO_2$ nanostructures of the present invention include energy and the environment. Energy applications include solar driven photocatalysis of water (i.e. water splitting to produce $H_2$) and photovoltaics. An embodiment of a photovoltaic cell of the present invention incorporates a $TiO_2$ nanostructure or nanostructures of the present invention in the photovoltaic cell taught in PCT Published Application No. WO 2009/012397, filed on Jan. 22, 2009, which is hereby incorporated by reference. Environmental applications include solar driven photocatalysis for abatement of water and air pollution.

An embodiment of a method of making a nanostructure of the present invention includes providing a crystalline nanostructure and changing a portion of the crystalline nanostructure to an amorphous phase. A remaining portion of the crystalline nanostructure and the amorphous phase each has a least one dimension on a nanometer scale. As used herein, a crystalline nanostructure may be a crystalline nanoparticle or an assembly of crystalline nanoparticles. With regards to the latter, the assembly of crystalline nanoparticles may be free-standing (e.g. a porous assembly of $TiO_2$ crystalline nanoparticles) or may be coupled to a substrate. Also, while the nanoparticles of the assembly of crystalline nanoparticles are crystalline, the assembly need not order the crystalline nanoparticles so that their crystalline nature extends beyond an individual nanoparticle. That is, the assembly may exhibit a crystalline nature beyond an individual crystalline nanoparticle or might exhibit disorder between adjacent crystalline nanoparticles. Further, the crystalline nanoparticles may exhibit a limited number of defects such as dislocations or twinned lattices.

Changing the portion of the crystalline nanostructure to the amorphous phase may include employing ions, atoms, or molecules to create disorder in the portion of the crystalline nanostructure. In an embodiment, changing the portion of the crystalline nanostructure to the amorphous phase employs hydrogenation, which includes placing the crystalline nanostructure in a $H_2$ environment at elevated temperature and pressure to produce an amorphous shell (or partial shell) surrounding (or partially surrounding) a crystalline core. More generally in such an embodiment, changing the portion of the crystalline nanostructure to the amorphous phase includes exposing the crystalline nanostructure to a gas at elevated temperature and pressure. The gas may be selected from $H_2$, He, Ar, some other noble gas, or some other suitable gas. If the gas is $H_2$, or some other gas with atoms that form bonds with the material of the nanostructure, dopants may remain in the amorphous phase of the nanostructure after completion of the gas exposure process. If the gas is He, Ar, or some other noble gas, the atoms are anticipated to migrate out of the amorphous phase of the nanostructure.

In another embodiment, changing the portion of the crystalline nanostructure to the amorphous phase employs ions to bombard the portion of the crystalline nanostructure. The ion bombardment may employ an ion source or an ion implanter. Alternatively, the ion bombardment may include striking a plasma in the vicinity of the nanostructure and applying a bias to the nanostructure. Depending upon the choice of ions, dopants may remain in the amorphous phase following the ion bombardment process.

According to an embodiment, the method of making the nanostructure of the present invention includes synthesizing the crystalline nanostructure, which may include providing a precursor and processing the precursor to produce the crystalline nanostructure. The precursor may be a gas, a liquid, a solution, a gel, or a solid. The processing of the precursor may include solution chemistry technique (e.g., a liquid, solution, or gel precursor) or a vapor deposition technique (e.g., a gaseous, liquid, or solid precursor). The solution chemistry technique may be chosen from a sol-gel technique, a hydrothermal technique, a solvothermal technique, a thermal technique, an electrochemistry technique, or some other suitable solution chemistry technique. The vapor deposition technique may be chosen from a physical vapor deposition technique or a chemical vapor deposition technique. Synthesizing the crystalline nanostructure may include or be followed by an annealing technique, which may be a vacuum annealing technique. Techniques for synthesizing crystalline nanostructures are known to those skilled in the art (see, e.g., Chen et al., Titanium Dioxide Nanomaterials: Synthesis, Properties, Modifications, and Applications, *Chem. Rev.* 107, 2891-2959 (2007); and Burda et al., Chemistry and Properties of Nanocrystals of Different Shapes, *Chem. Rev.* 105, 1025-1102 (2005)).

An embodiment of a method of photocatalysis of the present invention includes contacting a reactant fluid to a nanostructure. The nanostructure includes crystalline and amorphous phases. Each of the crystalline and amorphous phases having at least one dimension on a nanometer scale. The method further includes exposing the nanostructure to light. In an embodiment, the light includes sunlight. In another embodiment, the light includes simulated sunlight (i.e. from a light source designed to emit light having a spectrum similar to natural sunlight). The reactant fluid may be a liquid, a gas, or a combination of a liquid and a gas.

In an embodiment, the reactant fluid includes an environmental contaminant. In such an embodiment, the light striking the nanostructure causes at least some of the environmental contaminant to decompose. The environmental contaminant may be an organic contaminant such an organic chemical (e.g., methylene blue), bacteria, a virus, or some other organic contaminant.

In another embodiment, the reactant fluid includes water. In such an embodiment, the light striking the nanostructure causes the water to decompose, which produces hydrogen. In an embodiment, the reactant fluid is a solution that includes the liquid water and a sacrificial agent (e.g., an alcohol such as methanol).

In an embodiment, the nanostructure comprises a nanoparticle. In such an embodiment, additional nanoparticles may be added to the reactant fluid where each at least some of the additional nanoparticles comprise the crystalline and amorphous phases. In an embodiment, the nanostructure comprises a porous nanostructure that includes the crystalline and amorphous phases. In an embodiment, the nanostructure comprises titanium dioxide. In an embodiment, the nanostructure includes transition metal particles such as Pt particles on a surface of the nanostructure. Such transition metal particles may have a size within the range of about 0.5 to 500 nm.

Discussion:

$TiO_2$ nanostructures of the present invention have been produced that exhibit enhanced solar absorption. Such disorder-engineered $TiO_2$ nanostructures exhibit a substantial and stable solar-driven photocatalytic activity, along with a surprisingly large optical response to visible and near infrared radiation, absorbing photons over much of the solar spectrum.

In its simplest form, a disorder-engineered $TiO_2$ nanostructure includes two phases, one is crystalline $TiO_2$ (e.g., a quantum dot or a nanocrystal), and the second is an amorphous surface where disorder as well as a dopant are introduced (e.g., the nanoparticle 500 of FIG. 5). While an ensemble of nanoparticles of the present invention retains the benefits of crystalline $TiO_2$ quantum structures for photocatalytic processes, the introduction of disorder at their surfaces, together with dopant inclusion, significantly enhances optical absorption in the visible and infrared portions of the solar spectrum. This is based on the consideration that disorder in semiconductors yield band tails. Thus the distribution of electronic energy states differs from that of a single crystal, with donor-like states emerging in the conduction band tail and the corresponding states in the valence band tail. These extended energy states due to the introduction of disorders, in addition to energy levels produced by dopants, can become the dominant centers for optical excitation and recombination. FIG. 6C illustrates electronic energy levels of doped and disorder-engineered semiconductor nanoparticles that contribute to optical absorption, as compared to those of the bulk semiconductor in FIG. 6A and of the un-modified crystalline semiconductor nanoparticles in FIG. 6B.

To introduce disorder into a $TiO_2$ nanostructure with simultaneous dopant addition, a porous network of $TiO_2$ crystalline nanoparticles was produced in which each nanoparticle was a few nanometers in diameter. This was followed by hydrogenation that generated an amorphous, hydrogenated layer on the surfaces of the nanoparticles. A significant shift in the absorption spectrum of such disorder-engineered $TiO_2$ nanostructures was observed. The absorption edge of the absorption spectrum moved from the UV to near infrared after hydrogenation. This was accompanied by a dramatic color change and a significantly enhanced solar-driven photocatalytic activity. The band gap of the resulting black $TiO_2$ nanostructures is narrowed down to approximately 1.54 eV, as compared to about 3.30 eV for the un-modified nanocrystalline material.

$TiO_2$ nanocrystals were prepared using a sol-gel process through which an organic surfactant was employed as a template to direct the formation of a porous network of the $TiO_2$ nanocrystals. Calcination helped remove the organic template and enhance crystallization of the $TiO_2$, which was followed by heating in vacuum and hydrogenation under high pressure $H_2$ atmosphere at an elevated temperature.

$TiO_2$ nanocrystals were prepared with a precursor solution of titanium tetraisopropoxide (TTIP), ethanol, hydrochloric acid (HCl), deionized water, and the organic template, Pluronic F127. For example, the molar ratios of TTIP/F127/HCl/$H_2$O/ethanol can be 1:0.005:0.5:15:40. The range of molar ratios for each component of the solution can be 1:(0-1):(0-1):(1-50):(1-100). $TiO_2$ nanocrystals were prepared with a precursor solution of titanium butoxide, ethanol, hydrochloric acid (HCl), deionized water, and the organic template, Pluronic F127. For example, the molar ratios of titanium butoxide/F127/HCl/$H_2$O/ethanol can be 1:0.005:0.5:15:40. The range of molar ratios for each component of the solution can be 1:(0-1):(0-1):(1-50):(1-100). $TiO_2$ nanocrystals were also prepared with a precursor solution of titanium chloride, ethanol, hydrochloric acid (HCl), deionized water, and the organic template, Pluronic F127. For example, the molar ratios of titanium choloride/F127/HCl/$H_2$O/ethanol can be 1:0.005:0.5:15:40. The range of molar ratios for each component of the solution can be 1:(0-1):(0-1):(1-50):(1-100). In these solutions, titanium tetraisopropoxide, titanium butoxide, and titanium chloride can be replaced by other titanium precursors, such as titanium tetrapropoxide, isopropoxide, or other organo-metallic compounds including titanium. Ethanol can be replaced by other types of alcohol, such as methanol. Pluronic F127 can be replaced by other types of organic surfactants, such as P123, Triton X100. HCl can be replaced by other types of acid, such as $HSO_4$, $HNO_3$.

The solution was kept at 0° C. to 100° C. for a period from 1 to 72 hours, and then evaporated and dried at 60-200° C. for 1 to 72 hours. The dried powders were calcinated at a temperature in the range from 150 to 850° C. for 1 to 72 hours to remove the organic template and enhance crystallization of $TiO_2$. Both the temperature ramp rate and the cooling rate can be in the range from 0.01 to 1° C./min. The resulting white-colored powders of $TiO_2$ nanocrystals were first placed under vacuum for 30 minutes to 24 hour at a temperature of 20 to 500° C. and then hydrogenated in a 200 millibar to 300 bar $H_2$ atmosphere at 20 to 800° C. for 1 hour to 30 days to produce $TiO_2$ nanoparticles of the present invention.

Disorder-engineered $TiO_2$ nanoparticles have been made having a visual appearance that varies from white to gray to black by varying the hydrogenation parameters. For example, grey $TiO_2$ nanoparticles have been made with the hydrogenation parameters of pressure, temperature, and time of 5 bar, 250° C., and 12 hours and black $TiO_2$ nanoparticles have been made with the hydrogenation parameters of pressure, temperature, and time of 20 bar, 500° C., and 24 hours.

The structures of the $TiO_2$ nanocrystals before hydrogenation and of the $TiO_2$ nanoparticles (i.e. black $TiO_2$ nanoparticles) after hydrogenation were investigated with x-ray diffraction (XRD), Raman spectroscopy, and scanning and transmission electron microscopy (SEM and TEM); the results are provided in FIGS. 7A-7D.

Figure 7A:
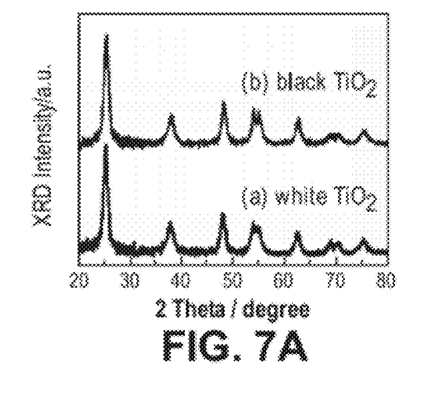
FIG. 7A provides XRD (x-ray diffraction) spectra for a white $TiO_2$ and a black $TiO_2$, the latter of which is an example of the present invention.

FIG. 7A provides XRD data for white and black $TiO_2$ nanoparticles in which the latter is an example of the present invention. Both the white and black $TiO_2$ nanoparticles were highly crystallized according to the strong XRD diffraction peaks. The crystalline phase for both has an anatase structure with an average crystal size around 8 nm. The crystal size from the XRD pattern was calculated using the Scherrer formula, $D=0.9\lambda/\beta \cos\theta$, where D is the crystal size, $\lambda$ is the wavelength of the x-ray radiation (0.15418 nm for Cu $K_\alpha$ radiation), $\beta$ is the full width at half maximum, and $\theta$ is the diffraction angle. After the hydrogenation process, the average size of the $TiO_2$ nanoparticles remains essentially unchanged.

Figure 7B:
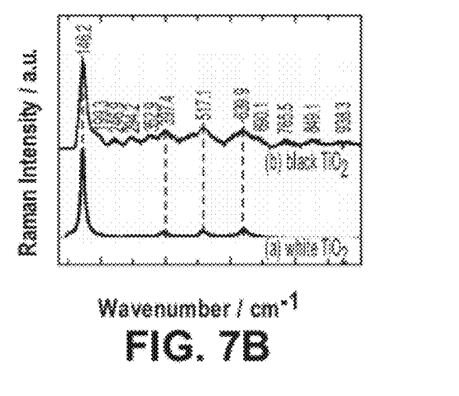
FIG. 7B provides Raman spectra for a white $TiO_2$ and a black $TiO_2$, the latter of which is an example of the present invention.

FIG. 7B provides Raman spectroscopy data, which was used to examine structural variations of the $TiO_2$ nanoparticles after disorder introduction through hydrogenation. The three polymorphs of $TiO_2$ belong to different space groups, $D_{4h}^{19}(I4_1/amd)$ for anatase, $D_{2h}^{15}$ (pbca) for brookite, and $D_{4h}^{14}(P4_2/mnm)$ for rutile, which have distinctive characteristics in Raman spectra. From the irreducible presentation of the optical modes, the anatase, brookite, and rutile phases have 6 ($3E_g+2B_{1g}+A_{1g}$), 36 ($9A_{1g}+9B_{1g}+9B_{2g}+9B_{3g}$), and 4 ($A_{1g}+B_{1g}+B_{2g}+E_g$) Raman-active modes, respectively. For anatase $TiO_2$, the six Raman-active modes are at 144, 197, 399, 515, 519 (superimposed with the 515 $cm^{-1}$ band), and 639 $cm^{-1}$, respectively. As shown in FIG. 7B, the un-modified, white $TiO_2$ nanocrystals displayed typical anatase bands. Nevertheless, new bands at 246.9, 294.2, 352.9, 690.1, 765.5, 849.1 and 938.3 $cm^{-1}$ emerged for black $TiO_2$ nanoparticles that are examples of the present invention. Other than the 246.9 $cm^{-1}$ band that might be attributed to a brookite-like structure, these new Raman bands cannot be assigned to any of the three polymorphs of $TiO_2$, which is indicative of the formation of new structural features after disorder-engineering through hydrogenation.

Figure 7C:
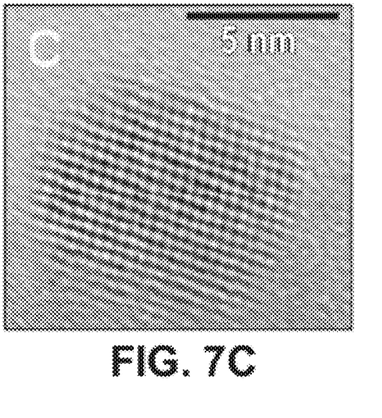
FIG. 7C provides a HRTEM (high resolution transmission electron microscopy) image of crystalline a $TiO_2$ nanoparticle.
Figure 7D:
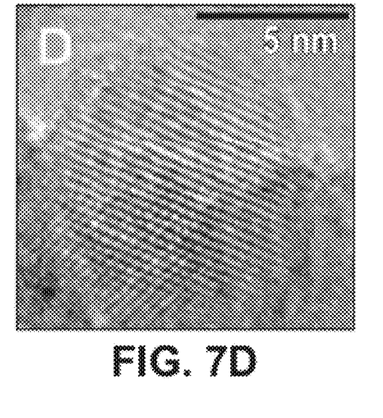
FIG. 7D provides a HRTEM image of a $TiO_2$ nanoparticle that is an example of the present invention.

FIGS. 7C and 7D provide HRTEM (high resolution TEM) images of white and black $TiO_2$ nanoparticles in which the latter is an example of the present invention. Electron microscopy observations indicate that $TiO_2$ nanoparticles formed a porous network with the size of individual crystalline particles approximately 8 nm. The $TiO_2$ nanocrystals (i.e. nanoparticles without disorder) were highly crystallized, as seen from the well-resolved lattice features shown in the HRTEM image in FIG. 7C. After hydrogenation, however, the surfaces of a $TiO_2$ nanoparticle that is an example of the present invention exhibits disorder, as shown in FIG. 7D. The disorder at the surface of the nanoparticle may be seen around the edge of the nanoparticle while the crystalline nature of most of the nanoparticle can be seen in the central portion of the nanoparticle. The disorder becomes more apparent when comparing FIG. 7D for the nanoparticle that is an example of the present invention with the nanocrystal of FIG. 7C that does not have disorder. In FIG. 7C it is clear that there is no disorder around the edge of the nanocrystal. This disordered outer layer resulting from hydrogenation in FIG. 7D, approximately 1 nm in thickness, is reflected by the many new vibrational modes observed in the Raman spectra of the black $TiO_2$ nanoparticles discussed above relative to FIG. 7B.

Figure 8A:
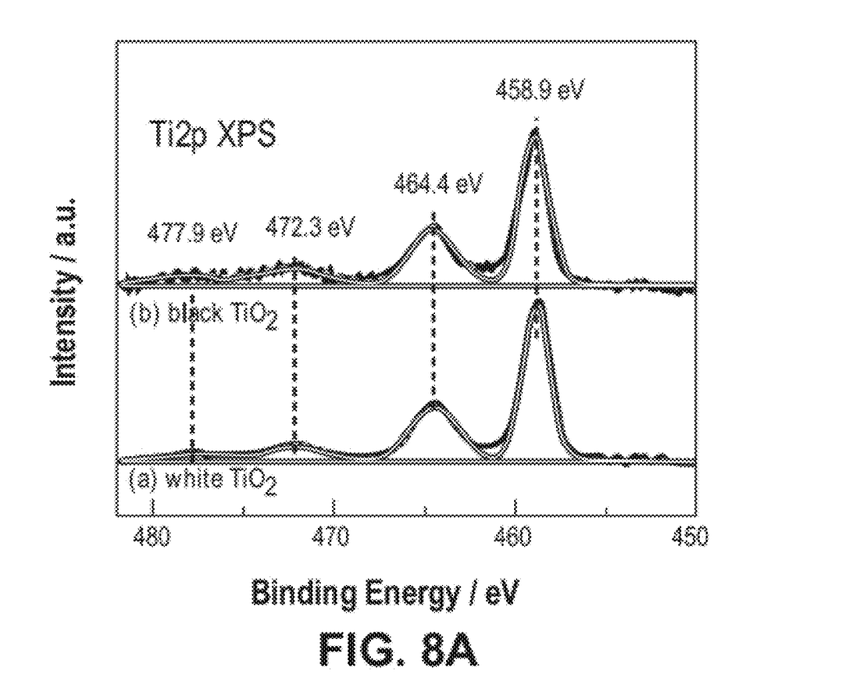
FIGS. 8A and 8B provide Ti 2p and O 1s XPS (x-ray photoelectron spectroscopy) data, respectively, for white and black $TiO_2$, the latter of which is an example of the present invention.
Figure 8B:
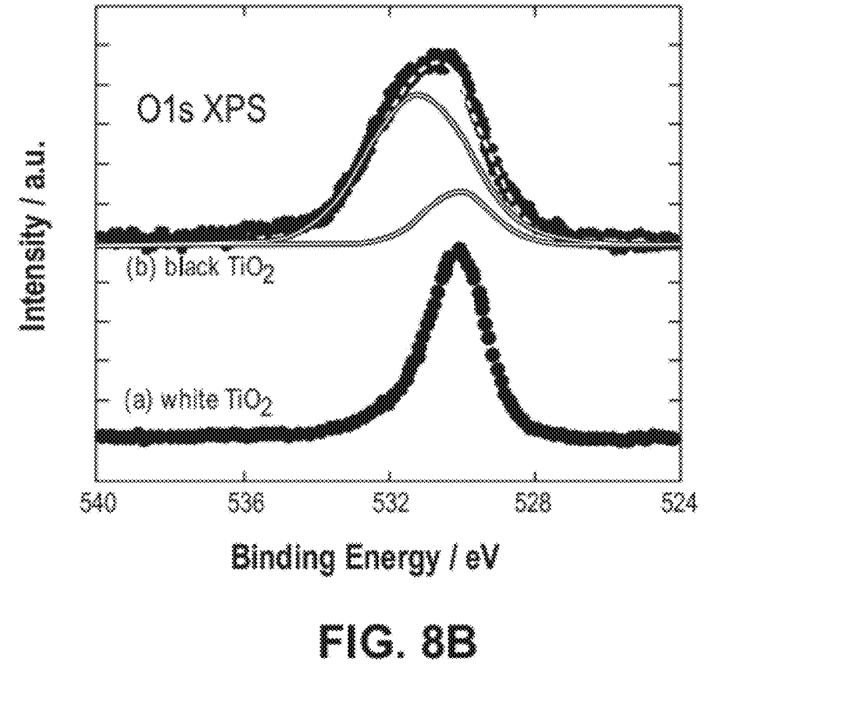

FIGS. 8A and 8B provide x-ray photoelectron spectroscopy (XPS) data, which was used to examine the change of surface chemical bonding due to hydrogenation of $TiO_2$ nanoparticles that are examples of the present invention. The valence state of the titanium atoms is $Ti^{4+}$ for both the white and black $TiO_2$ nanoparticles, as shown in FIG. 8A. The Ti 2p XPS data were almost identical, suggesting that titanium atoms have similar bonding environment after hydrogenation. In the Ti 2p spectral region, there are four peaks at 458.9, 464.4, 472.3, and 477.9 eV. These peaks can be attributed to Ti 2p3/2, Ti 2p1/2 and their satellite peaks with typical $Ti^{4+}$ characteristic binding energies. All Ti 2p signals are symmetric with no shoulders at the lower energy sides, suggesting that defect concentration associated with $Ti^{3+}$ was minimal. In contrast, the O 1s XPS spectra of the white and black $TiO_2$ nanoparticles have drastic differences, as shown in FIG. 8B, indicating a change of the bonding environment for oxygen atoms after hydrogenation. The O 1s XPS spectra can be resolved into two peaks at about 530.0 and 530.9 eV. The narrower peak at 530.0 eV has typical $O^{2-}$ binding energy with $TiO_2$ composition, and the broader peak at 530.9 eV can be attributed to Ti—OH species. For un-modified, white $TiO_2$ nanocrystals, the O 1s peak is dominated at 530.0 eV, typical for crystalline $TiO_2$. However, for the black $TiO_2$ nanoparticles, the dominant O 1s peak moved to a much wider band at 530.9 eV, suggesting that Ti—OH bonding distribute over an environment with large disorders on nanoparticle surfaces.

FIGS. 9A-9D provide visual, optical, and band gap data for porous networks of black $TiO_2$ nanoparticles, which are examples of the present invention, and porous networks of white $TiO_2$ nanocrystals for comparison purposes.

Figure 9A:
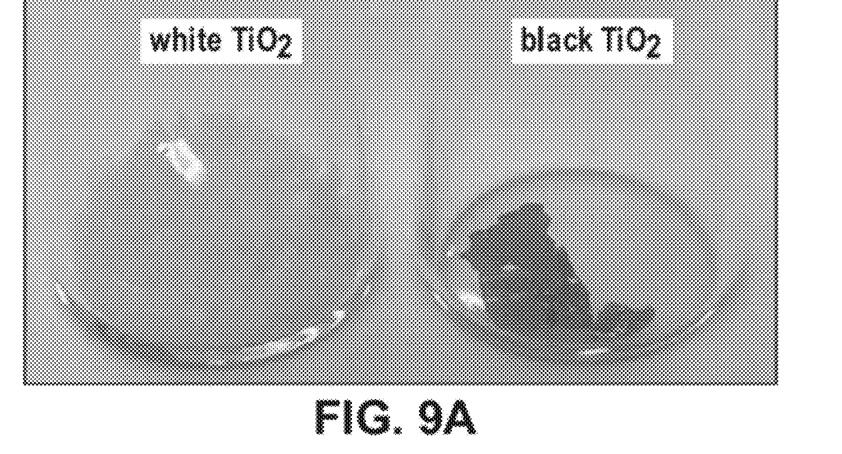
FIG. 9A is a photo comparing white and black $TiO_2$, the latter of which is an example of the present invention.
Figure 9B:
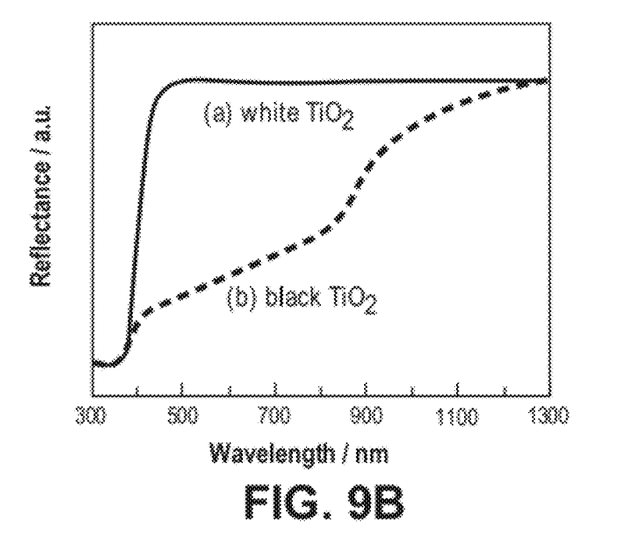
FIG. 9B provides spectral reflectance for white and black $TiO_2$, the latter of which is an example of the present invention.
Figure 9C:
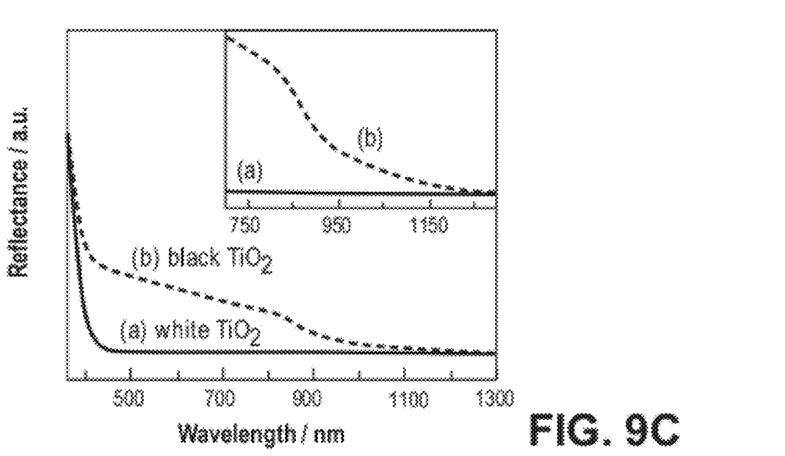
FIG. 9C provides absorbance for white and black $TiO_2$, the latter of which is an example of the present invention, FIG. 9D provides valence band XPS data for white and black $TiO_2$, the latter of which is an example of the present invention.

FIG. 9A is a photograph of white porous networks of $TiO_2$ nanocrystals and porous networks of black $TiO_2$ nanoparticles, which provides a visual color comparison before and after hydrogenation. Measured with diffusive reflectance and absorbance spectroscopy and shown in FIGS. 9B and 9C, the band gap of un-modified, white $TiO_2$ nanocrystals is approximately 3.30 eV, slightly greater than that of the bulk anatase $TiO_2$ due to quantum confinement-induced band gap enlargement. The un-modified, white $TiO_2$ nanocrystals exhibited an absorption edge of about 430 nm. After hydrogenation, the color of the disorder-engineered $TiO_2$ nanoparticles turned to black (FIG. 9A), with absorption edge in the near infrared beyond 1200 nm (~1 eV). The optical property of a material is a reflection of its intrinsic electronic structure such as the transitions from an occupied electronic level to an empty level; they are transitions from the valence band to the conduction band in a pure semiconductor. When dopants and disorders are introduced, additional extrinsic electronic levels can be located in the band gap. The long-tail absorption of the disorder-engineered $TiO_2$ nanoparticles in the near infrared wavelength regime can be assigned to optical transitions involved with surface disorders that have corresponding features in the O 1s XPS spectrum. An abrupt change in both the reflectance and absorbance spectra at approximately 806.8 nm (1.54 eV) can be assigned to the band gap transition of the disorder-engineered $TiO_2$ nanoparticles. This result suggests that the band gap of the black $TiO_2$ nanoparticles is significantly narrowed. Meanwhile, no color change was observed for the disorder-engineered $TiO_2$ nanoparticles over a period of one year since they were synthesized for the first time.

Figure 9D:
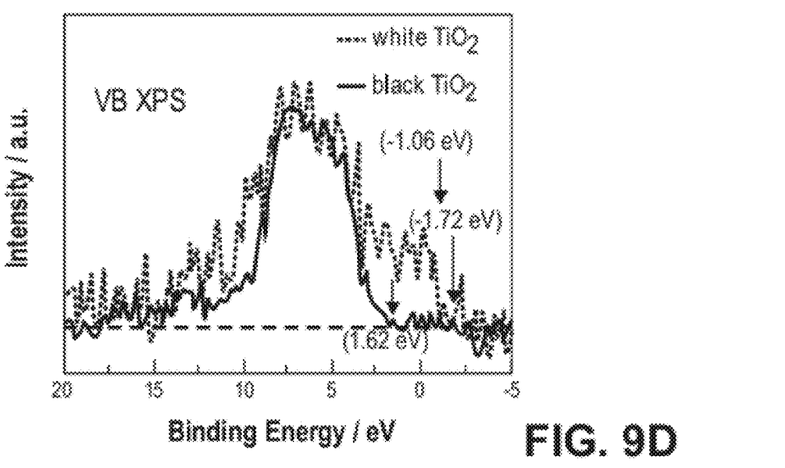
Figure 9E:
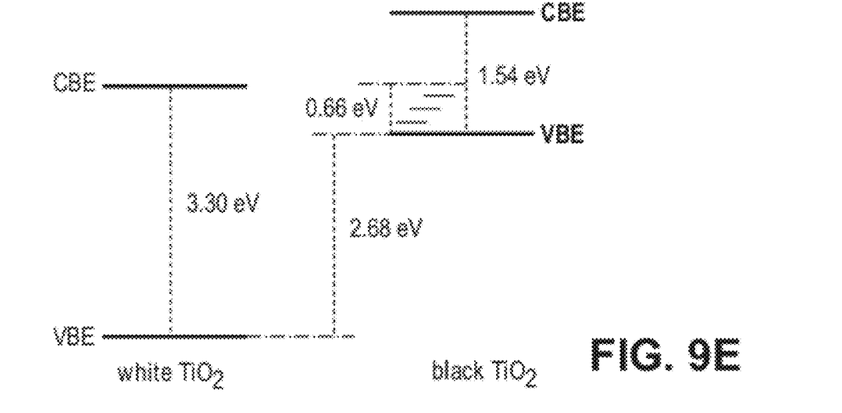
FIG. 9E provides electronic energy band structure of $TiO_2$ nanostructures, in accordance with an example of the present invention, and compares it to that of crystalline $TiO_2$ nanostructures.

The density of states (DOS) of the valence band of $TiO_2$ nanoparticles was also measured by XPS. FIG. 9D shows the valence band XPS result of disorder-engineered $TiO_2$ nanoparticles through hydrogenation, as compared to that of the un-modified, white nanocrystals. The white $TiO_2$ nanocrystals display typical valence band characteristics of $TiO_2$ with the onset energy at about 1.62 eV, in excellent agreement with the literature. Since the band gap of $TiO_2$ is 3.30 eV from the optical absorption spectrum, the edge of its conduction band would occur at the position of −1.68 eV. For the black $TiO_2$ nanoparticles, the edge of the valence band moves toward the vacuum level with the onset at −1.72 eV and the shoulder of the valence band edge at −1.06 eV. Combined with the results from optical measurements, the valence band XPS onset can be assigned to the contribution from the disorder, while the XPS shoulder can be assigned to the valence band edge. Thus, an illustration of the electronic band structure of the black $TiO_2$ nanoparticles can be obtained as shown schematically in FIG. 9E. Compared to that of a white $TiO_2$ nanocrystal, the valence band edge of the black $TiO_2$ nanoparticle moves up 2.68 eV, and the conduction band edge moves up 0.92 eV towards the vacuum level, with a band gap of 1.54 eV and disorder band tail states near the valence band edge.

Solar-driven photocatalytic activity of the disorder-engineered, black $TiO_2$ nanoparticles was examined by monitoring the change in optical absorption of a methylene blue solution around 660 nm during its photocatalytic decomposition process. Other than being a reference nitrogenous compound for evaluating photocatalysts, methylene blue happens to be a common water contaminant that threats the ecosystem as well as human health. Solar-driven photocatalysis measurements were conducted by irradiating the sample solutions with a Newport Oriel full spectrum solar simulator, installed with an AM 1.5 air mass filter that generates about 1 sun power. In a typical experiment, an amount of 0.15 mg black $TiO_2$ nanoparticles was added into a 3.0 ml methylene blue solution that has an optical density (O.D.) of approximately 1.0. In monitoring the photocatalytic decomposition process, optical absorption spectra of the methylene blue solution were measured with a Varian Cary Bio50 UV-visible spectrometer under aerobic conditions and corrected for methylene blue degradation in the absence of any photocatalyst.

Figure 10A:
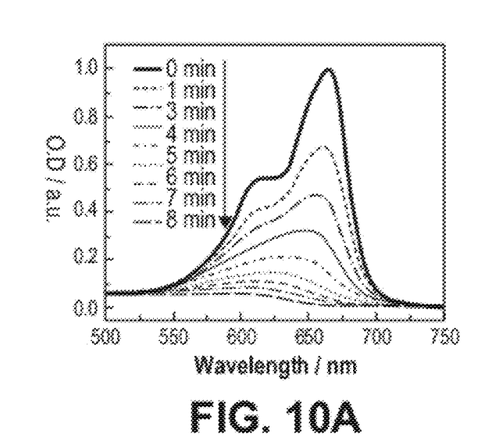
FIG. 10A provides absorption spectra over time during a photocatalysis experiment in which a methylene blue solution was placed in a container that included black $TiO_2$ nanoparticles, which are examples of the present invention, and that was irradiated with simulated solar light.
Figure 10B:
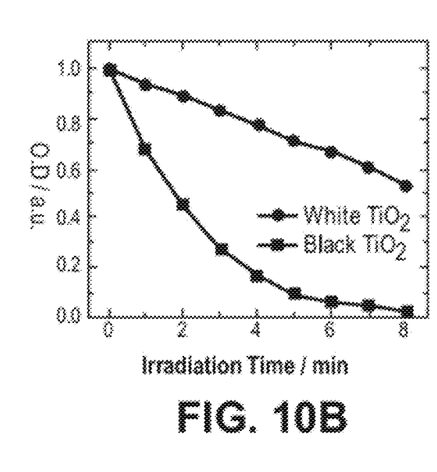
FIG. 10B provides a comparison of solar-driven photocatalytic activity of black $TiO_2$ nanostructures, which are examples of the present invention, against that of white $TiO_2$ nanostructures under similar experimental conditions.
Figure 11:
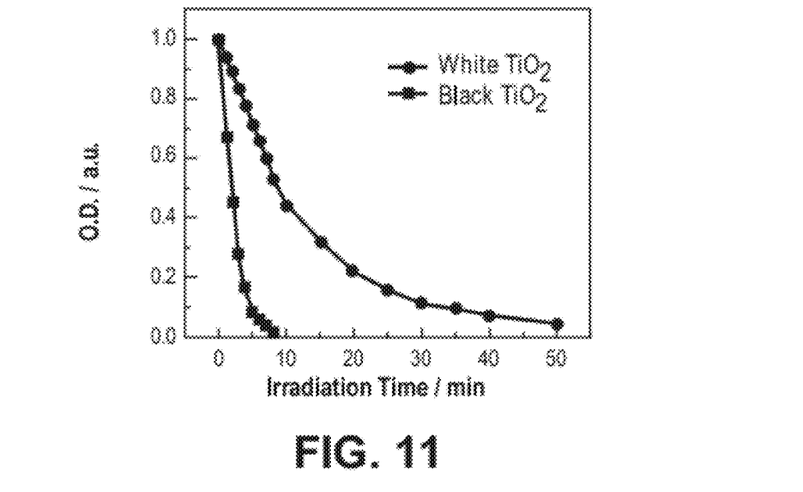
FIG. 11 provides a comparison of solar-driven photocatalytic activity of black $TiO_2$ nanoparticles, which are examples of the present invention, against that of white $TiO_2$ nanocrystals under similar experimental conditions.

FIGS. 10A-10C provide results of these photocatalysis experiments in which black $TiO_2$ nanoparticles, which are examples of the present invention, were placed in a methylene blue solution and exposed to simulated solar radiation. FIG. 10A shows variations of the absorption spectra of the methylene blue solution over time upon adding the black $TiO_2$ nanoparticles and applying the simulated solar light. The spectral intensity decreases rapidly with an increase of irradiation time, indicating that the methylene blue molecules are rapidly breaking down. FIG. 10B compares solar-driven photocatalytic activity of the disorder-engineered, black $TiO_2$ nanoparticles against that of the un-modified, white $TiO_2$ nanocrystals under the same testing conditions, in which the x axis is the irradiation time and the y axis is the O.D. of the methylene blue solution. Photo-degradation is complete approximately 8 minutes after initiation of the simulated solar radiation when the photocatalysts were black $TiO_2$ nanoparticles, which represents a greater than 300% improvement over the case where white $TiO_2$ nanocrystals were used as the photocatalysts. This greater than 300% improvement is shown FIG. 11. The photo-degradation for the black $TiO_2$ nanoparticles is complete at 8 minutes while the photo-degradation for white $TiO_2$ nanocrystals is not yet complete at 50 minutes.

Figure 10C:
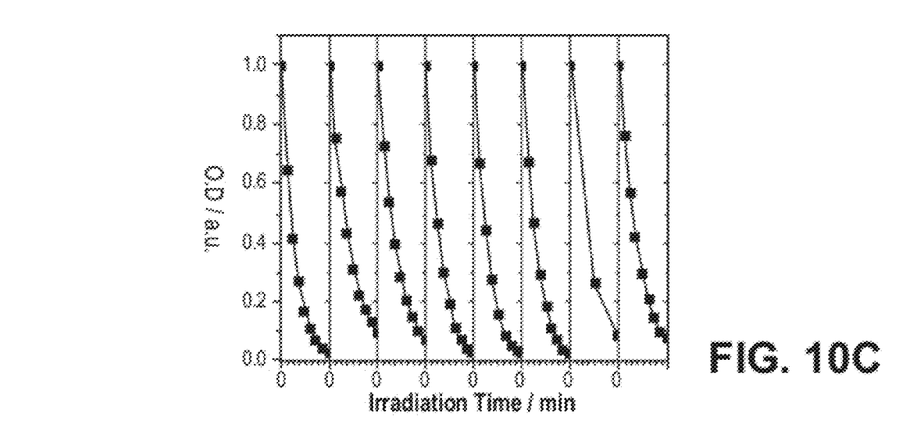
FIG. 10C provides data from cycling tests of solar-driven photocatalytic activity of disorder-engineered, black $TiO_2$ nanoparticles, which are examples of the present invention.

FIG. 10C shows the result of cycling tests of the superior solar-driven photocatalytic activity of the disorder-engineered, black $TiO_2$ nanoparticles. Once the photocatalytic reaction of a testing cycle was complete, the subsequent cycle was started after an amount of concentrated methylene blue compound was added to make the O.D. of the solution approximately 1.0. FIG. 10C plots the first 8-minute data in each of eight consecutive photo-degradation cycles, which shows that the black $TiO_2$ nanoparticles do not exhibit reduction of their photocatalytic activity under solar radiation, even after repeated photocatalysis cycles.

Figure 12:
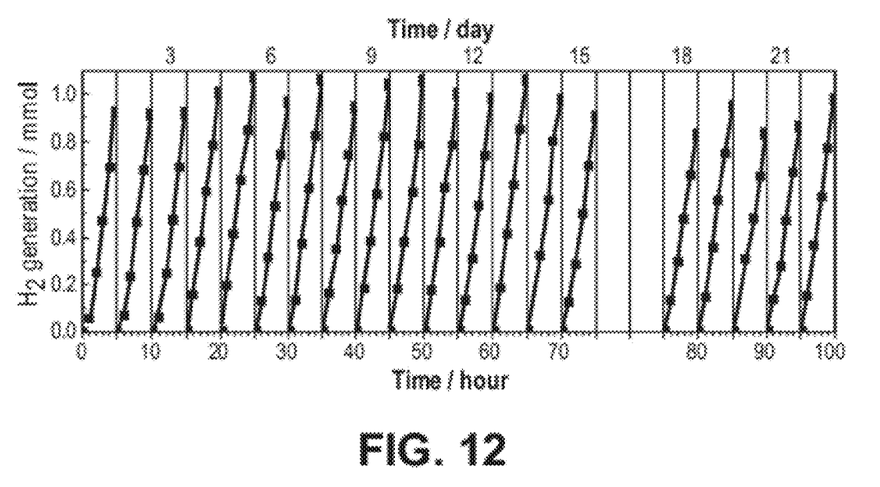
FIG. 12 provides data from tests of solar-driven photocatalysis of water that produced hydrogen using black $TiO_2$ nanoparticles, which are examples of the present invention.

In addition to a superior photocatalytic capability in decomposing methylene blue as an example water contaminant, the disorder-engineered, black $TiO_2$ nanoparticles exhibit unprecedented efficiency and stability of photocatalytic hydrogen production under sunlight. FIG. 12 shows measured quantities of hydrogen gas as a function of time over a 22-day testing period of solar hydrogen production with disorder-engineered, black $TiO_2$ nanoparticles as the photocatalyst. Solar hydrogen experiments were conducted under conditions simulating daily solar activities. The full spectrum solar simulator was used as the excitation source, which produces about one sun power at the sample consisting of black $TiO_2$ nanoparticles loaded with 0.6 wt % Pt, placed in a Pyrex glass container filled with 1:1 water-methanol solution. Methanol is commonly applied as the sacrificial agent for solar water splitting that enhances trapping of photogenerated holes in addition to enabling pure hydrogen gas release. Measurements were conducted initially for 15 consecutive days; each day the sample was irradiated for five hours, and then stored in darkness overnight before testing the next day. Hydrogen generation was measured using a Varian gas chromatograph and data were taken approximately every hour during solar irradiation.

About 0.2±0.02 mmol hydrogen gas can be generated under one hour solar irradiation with about 0.02 grams of disorder-engineered, black $TiO_2$ nanoparticles, yielding a hydrogen production rate of 10 mmol per hour per gram of photocatalysts. This hydrogen production rate, measured under simulated sunlight, is two orders of magnitude greater than the yields of known semiconductor photocatalysts. After testing for 13 days, 30 ml pure water was added to compensate for the loss and measurements continued for two additional days before the sample was stored in darkness for two days (days 16 & 17) without measurements. Experiments were resumed for five more days after the two-day storage period. Throughout the testing cycles, the disorder-engineered, black $TiO_2$ nanocrystals exhibit superior stability in addition to very high hydrogen production capability. For comparison, unmodified white $TiO_2$ nanocrystals were also tested under the same experimental conditions and no hydrogen gas was detected.

As the hydrogenation process was applied to realize disorder-engineered $TiO_2$ nanocrystals, we conducted experiments to quantify the amount of hydrogen absorbed in black $TiO_2$. Measurements were conducted using a hydrogen storage capacity testing system (Intelligent Gravimetric Analyzer, Hiden Isochema), and we found that black $TiO_2$ nanoparticles contain about 0.25 wt.% of hydrogen. In solar hydrogen production experiments, 20.0 mg of black $TiO_2$ photocatalysts were used, which produced 20 mmol (40 mg) of hydrogen over a period of 100 hours. Note that, 20.0 mg of black $TiO_2$ photocatalysts only contain about 0.05 mg of hydrogen, which is significantly smaller than the amount of hydrogen generated (40 mg) in the solar hydrogen production experiments. This result indicates that black $TiO_2$ photocatalysts do not act as a hydrogen reservoir for solar-driven hydrogen production; it is consistent with the observation that the photocatalysts remain black after cycling experiments.

To evaluate what fraction of the solar hydrogen activity of black TiO2 is due to the visible and infrared portion of the solar spectrum, we measured photocatalytic hydrogen production by placing an UV filter in front of the solar simulator that blocks photons with wavelength shorter than 400 nm. While white TiO2 nanocrystals do not exhibit any visible and infrared photocatalytic activity, hydrogen production was observed under visible and infrared irradiation using black TiO2 as the photocatalyst. The rate of hydrogen production under visible and infrared light was measured to be about 0.1 mmol per hour per gram of photocatalysts. Although small compared to hydrogen production under simulated sunlight, this rate is consistent with the microscopic structure of individual black TiO2 nanoparticles in which, disorders are present at the surface layer (~1 nm) while the majority of the volume remains single crystalline. On the other hand, for UV as well as for visible and infrared light-excited electrons, the disorder layer of black TiO2 nanoparticles offers much-desired trapping sites to suppress rapid carrier recombination, thus creating a significantly higher hydrogen production rate than what conventional photocatalysts can achieve.

The realization of black $TiO_2$ nanostructures, such as black $TiO_2$ nanoparticles and porous networks of such particles, that absorb photons in the entire range of the solar spectrum offers an unprecedented, nearly ideal photocatalyst that has not only a substantially enhanced photocatalytic activity under solar radiation but also the desired stability for practical implementation. In fact, the black $TiO_2$ nanostructures irradiated constantly by fluorescent light at room temperature for over a year exhibit essentially the same superior photocatalytic activity. Applications of solar-driven photocatalysis for decomposition of organic compounds or splitting of water, for example, are highly scalable and economical, as compared to the processes that primarily rely on UV radiation. One the other hand, the concept of disorder engineering introduced in this report opens a new route for manipulating optical absorption of semiconductor nanostructures in general. It is anticipated that, through disorder engineering along with proper doping, band gap energy is less a limiting factor for many wide band gap materials that are traditionally not considered for solar energy applications. Whatever the future may be for these non-traditional semiconductors, it is tantalizing to envision diverse clean energy and environmental technologies enabled by the black $TiO_2$, achieved here with disorder engineering through hydrogenation.

REFERENCES

1. Grätzel, M., Photoelectrochemical cells, *Nature*, 414, 338-344 (2001).
2. Hoffmann, M. R., Martin, S. T., Choi, W., & Bahnemann, D. W., Environmental applications of semiconductor photocatalysis, *Chem. Rev.*, 95, 69-96 (1995).
3. Fujishima, A., Zhang, X. & Tryk, D. A., $TiO_2$ photocatalysts and related surface phenomena, *Surf. Sci. Rpts*, 63, 515-582 (2008)
4. Asahi, R., Morikawa, T., Ohwaki, T., Aoki, K., & Taga, Y., Visible-light photocatalysis in nitrogen-doped titanium oxides, *Science*, 293, 269-271 (2001).
5. Chen, X. B. & Burda, C., The electronic origin of the visible-light absorption properties of C-, N- and S-doped TiO2 nanomaterials, *J. Am. Chem. Soc.*, 130, 5018-5019 (2008).
6. Chen, X. & Mao, S. S., Titanium dioxide nanomaterials: Synthesis, properties, modifications, and applications, *Chem. Rev.*, 107, 2891-2959 (2007).
7. Burda, C., Chen, X., Narayanan, R., & El-Sayad, M. A., Chemistry and properties of nanocrystals of different shapes, *Chem. Rev.*, 105, 1025-1102 (2005).
8. PCT Published Application No. WO 2009/012397, published on Jan. 22, 2009.

It is noted that as used herein and in the appended claims, the singular forms "a", "and", and "the" include plural referents unless the context clearly dictates otherwise.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A nanoparticle comprising:
   a titanium dioxide ($TiO_2$) crystalline core; and
   a $TiO_2$ amorphous outer most shell in contact with and completely surrounding the crystalline core, wherein the $TiO_2$ amorphous outer most shell further comprises a hydrogen dopant and has a composition different than the $TiO_2$ crystalline core.

2. The nanoparticle of claim 1 wherein the nanoparticle size is within a range of about 0.5 to 200 nm.

3. The nanoparticle of claim 1 wherein the nanoparticle size is within a range of about 0.5 to 100 nm.

4. The nanoparticle of claim 1 wherein a combination of the $TiO_2$ crystalline core and $TiO_2$ amorphous outer most shell produces a semiconductor bandgap that is smaller than the semiconductor bandgap that is found individually in the $TiO_2$ crystalline core or the $TiO_2$ amorphous outer most shell.

5. The nanoparticle of claim 1 wherein an absorption edge for an absorbance that has a wavelength greater than the absortion edge that is found individually in the $TiO_2$ crystalline core or the $TiO_2$ amorphous outer most shell.

6. The nanoparticle of claim 1 wherein the nanoparticle is selected from the group consisting of a branched nanoparticle, a nanodisk, a nanorod, a nanospindle, a nanowire, and a quantum dot.

7. The nanoparticle of claim 1 wherein the nanoparticle has an absorbance within a visual portion of a solar spectrum with an absorption edge greater than about 850 nm.

8. The nanoparticle of claim 1 wherein the nanoparticle has an absorbance within visual and infrared portions of a solar spectrum with an absorption edge greater than about 925 nm.

9. The nanoparticle of claim 1 wherein the nanoparticle has an absorbance within visual and infrared portions of a solar spectrum with an absorption edge greater than about 1,000 nm.

* * * * *